(12) United States Patent
Bayha et al.

(10) Patent No.: US 11,276,062 B1
(45) Date of Patent: Mar. 15, 2022

(54) AUGMENTED REALITY SECURITY APPLICATIONS

(71) Applicant: Wells Fargo Bank, N.A., San Francisco, CA (US)

(72) Inventors: Harlen Bayha, San Diego, CA (US); Jennifer Stacey Borchardt, San Francisco, CA (US); Adam Clifford Christensen, Moraga, CA (US); Charles Cowell, Dublin, CA (US); Eduardo DeLa Torre, Oakland, CA (US); Kourtney Eidam, Marietta, GA (US); Darren M. Goetz, Salinas, CA (US); Eric David Greene, Piedmont, CA (US); Robert Glenn Hamchuk, San Jose, CA (US); Miranda C. Hill, Seattle, WA (US); Pey-Ning Huang, San Francisco, CA (US); Richard Harrison Luttrell, Jr., Huntersville, NC (US); Orsolya Oldroyd, Walnut Creek, CA (US); Paul Vittimberga, Oakland, CA (US); Dominik Vltavsky, Belmont, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 603 days.

(21) Appl. No.: 15/485,983

(22) Filed: Apr. 12, 2017

Related U.S. Application Data

(63) Continuation-in-part of application No. 14/151,974, filed on Jan. 10, 2014, now Pat. No. 9,792,594.

(51) Int. Cl.
*G06Q 20/40* (2012.01)
*G07F 19/00* (2006.01)
(Continued)

(52) U.S. Cl.
CPC ..... *G06Q 20/4014* (2013.01); *G06K 9/00892* (2013.01); *G06Q 20/1085* (2013.01);
(Continued)

(58) Field of Classification Search
USPC .......................................................... 705/43
See application file for complete search history.

(56) References Cited

U.S. PATENT DOCUMENTS

| 5,832,296 A | 11/1998 | Wang et al. |
| 6,959,389 B1 * | 10/2005 | Dunn .................... H04M 3/382 713/183 |

(Continued)

FOREIGN PATENT DOCUMENTS

GB          2461975 A          1/2010

OTHER PUBLICATIONS

Tully, Jim et al., "Internet of Things Primer for 2016," Mar. 31, 2016, 8 pages.
(Continued)

*Primary Examiner* — Kelly S. Campen
*Assistant Examiner* — Shacole C Tibljas
(74) *Attorney, Agent, or Firm* — Merchant & Gould P.C.

(57) ABSTRACT

A method implemented on an augmented reality electronic device includes establishing a wireless connection with an automated teller machine (ATM). The AR electronic device is used to authenticate a user of the AR electronic device at the ATM. An initiation is permitted of a financial transaction through user interface functionality for the ATM that is displayed on the AR electronic device. Financial information for the financial transaction is displayed on a display screen of the AR electronic device, instead of displaying the financial information at the ATM.

8 Claims, 10 Drawing Sheets

(51) Int. Cl.
*G06Q 20/10* (2012.01)
*G06T 11/60* (2006.01)
*G06K 9/00* (2006.01)
*G06F 3/0482* (2013.01)

(52) U.S. Cl.
CPC ............ *G06T 11/60* (2013.01); *G07F 19/202* (2013.01); *G07F 19/203* (2013.01); *G06F 3/0482* (2013.01)

(56) References Cited

U.S. PATENT DOCUMENTS

| | | | |
|---|---|---|---|
| 7,634,662 | B2 | 12/2009 | Monroe |
| 7,653,600 | B2 | 1/2010 | Gustin et al. |
| 7,822,684 | B2 | 10/2010 | Rielly et al. |
| 7,890,433 | B2 | 2/2011 | Singhal |
| 7,980,462 | B1 | 7/2011 | Graef et al. |
| 8,033,453 | B2 | 10/2011 | Scanlon |
| 8,070,055 | B2 | 12/2011 | Block et al. |
| 8,090,159 | B2 | 1/2012 | Gabara |
| 8,244,002 | B2 | 8/2012 | Chen et al. |
| 8,245,915 | B1 | 8/2012 | Ramachandran et al. |
| 8,332,320 | B2 | 12/2012 | Singh |
| 8,370,639 | B2 | 2/2013 | Azar et al. |
| 8,438,110 | B2 | 5/2013 | Calman et al. |
| 8,632,000 | B2 | 1/2014 | Laracey |
| 8,881,977 | B1 | 11/2014 | Paczkowski et al. |
| 9,004,353 | B1 * | 4/2015 | Block .................... G07F 19/20 235/379 |
| 9,038,894 | B2 | 5/2015 | Khalid |
| 9,087,428 | B1 | 7/2015 | Velline et al. |
| 9,135,611 | B1 * | 9/2015 | Medina, III ........... G06Q 20/20 |
| 9,218,361 | B2 | 12/2015 | Cardohna et al. |
| 9,384,477 | B2 | 7/2016 | Johnson et al. |
| 9,413,534 | B2 | 8/2016 | Pieczul et al. |
| 9,418,358 | B2 | 8/2016 | Johnson et al. |
| 2005/0215238 | A1 | 9/2005 | Macaluso |
| 2011/0055084 | A1 * | 3/2011 | Singh .................. G06Q 20/1085 705/43 |
| 2011/0150296 | A1 | 6/2011 | Eckhoff et al. |
| 2011/0238573 | A1 | 9/2011 | Varadarajan |
| 2011/0320294 | A1 | 12/2011 | Votaw et al. |
| 2012/0197797 | A1 * | 8/2012 | Grigg ..................... G07F 19/20 705/43 |
| 2012/0197798 | A1 | 8/2012 | Grigg et al. |
| 2012/0212414 | A1 | 8/2012 | Osterhout et al. |
| 2012/0231424 | A1 | 9/2012 | Calman et al. |
| 2012/0231814 | A1 | 9/2012 | Calman et al. |
| 2012/0232937 | A1 | 9/2012 | Calman et al. |
| 2012/0232966 | A1 | 9/2012 | Calman et al. |
| 2012/0232968 | A1 | 9/2012 | Calman et al. |
| 2012/0232976 | A1 | 9/2012 | Calman et al. |
| 2012/0232977 | A1 | 9/2012 | Calman et al. |
| 2012/0233015 | A1 | 9/2012 | Calman et al. |
| 2012/0233032 | A1 | 9/2012 | Calman et al. |
| 2012/0233072 | A1 * | 9/2012 | Calman .................. G06Q 40/02 705/44 |
| 2012/0265679 | A1 | 10/2012 | Calman et al. |
| 2013/0033522 | A1 | 2/2013 | Calman et al. |
| 2013/0057585 | A1 | 3/2013 | Athsani et al. |
| 2013/0124411 | A1 | 5/2013 | Kobres et al. |
| 2014/0115492 | A1 | 4/2014 | Tehranchi et al. |
| 2014/0164244 | A1 | 6/2014 | Wilson |
| 2014/0210621 | A1 | 7/2014 | Argue et al. |
| 2014/0347265 | A1 | 11/2014 | Aimone et al. |
| 2015/0058216 | A1 | 2/2015 | Luciani |
| 2015/0127714 | A1 | 5/2015 | Ivashyn |
| 2015/0134430 | A1 | 5/2015 | Ellis et al. |
| 2015/0154598 | A1 | 6/2015 | Forte et al. |
| 2015/0221151 | A1 | 8/2015 | Bacco et al. |
| 2015/0287018 | A1 | 10/2015 | Iqbal et al. |
| 2016/0037137 | A1 | 2/2016 | Seiflein |
| 2016/0132754 | A1 | 5/2016 | Akhbardeh et al. |
| 2016/0162869 | A1 | 6/2016 | Gupta et al. |
| 2017/0132593 | A1 * | 5/2017 | Block .............. G06Q 20/40145 |

OTHER PUBLICATIONS

Velosa, Alfonso, et al., "Hype Cycle for the Internet of Things, 2016," Jul. 14, 2016, 68 pages.
Velosa, Alfonso et al., "Maturity Model for the Internet of Things," Mar. 2, 2016, 18 pages.
Tully, Jim, "IoT: Key Lessons to Date and Action Plan for 2016," Feb. 12, 2016, 8 pages.
Prentice, Stephen, "The Six Forces That Will Shape Business and Technology in 2030," Feb. 1, 2016, 9 pages.
Friedman, Ted et al., "Predicts 2016: Unexpected Implications Arising From the Internet of Things," Dec. 3, 2015, 13 pages.
Cearley, David W. et al., "Top 10 Strategic Technology Trends for 2016," Feb. 29, 2016, 15 pages.
Burke, Brian et al., "Top 10 Strategic Technology Trends for 2016: Internet of Things Architecture and Platforms," Feb. 19, 2016, 11 pages.
Cearley, David W. et al., "Top 10 Strategic Technology Trends for 2016: Ambient User Experience," Feb. 26, 2016, 11 pages.
Walker, Mike J. et al., "Top 10 Strategic Technology Trends for 2016: Information of Everything," Feb. 26, 2016, 11 pages.
Plummer, Daryl C. et al., "Top Strategic Predictions for 2016 and Beyond: The Future is a Digital Thing," Oct. 2, 2015, 27 pages.
Jones, Nick, "Top 10 IoT Technologies for 2017 and 2018," Jan. 22, 2016, 12 pages.
Geschickter, Chet et al., "Measuring the Strategic Value of the Internet of Things for Industries," Apr. 28, 2016, 14 pages.
Furlonger, David et al., "Toolkit: IoT Strategic Technology Map for Financial Services Initiatives," Dec. 2, 2015, 4 pages.
Furlonger, David et al., "Survey Analysis: Financial Services CIOs Should Not Ignore the Internet of Things," Mar. 17, 2015, 17 pages.
Moyer, Kristin R. et al., "Measuring the Strategic Value of Financial Services IoT," Dec. 2, 2015, 10 pages.
Newton, Alistair et al., "Gartner's Digital Banking Customer Advisory Framework," Jul. 7, 2016, 8 pages.
Moyer, Kristin R., "Industry Vision: Banks as Platforms," Apr. 22, 2016, 11 pages.
Moyer, Kristin R. et al., "Industry Vision: Tipping Point for Banks as Platforms," May 3, 2016, 11 pages.
Moyer, Kristin R., "The Economics of Connections for Banking," Mar. 8, 2016, 12 pages.
Geschickter, Chet et al., "Survey Analysis: Early Adopters of Internet of Things Poised to Make 2016 the Year of the Customer," Feb. 12, 2016, 15 pages.
Lehong, Hung et al., "Building a Digital Business Technology Platform," Jun. 8, 2016, 21 pages.
Yayla et al., "An Exploration of Using Face Recognition Technologies for National Security," http://www.pa.edu.tr/APP_DOCUMENTS/D478B2AD-3813-4555-9629-6332F8CF8D33/cms_statik/_dergi/2004/1-2/141-158.pdf 2004, 18 pages.
Elash et al., "Canadian casinos, banks, police use facial-recognition technology," http://www.theglobeandmail.com/news/national/time-to-lead/canadian-casinos-banks-police-use-facial-recognition-technology/article590998/, 2012, 2 pages.
Mok et al., "Addressing Biometrics Security and Privacy Related Challenges in China," http://pact.vitamib.com/documents-1/news-documents/Paper_16_IEEE_web_version.pdf, 2012, 8 pages.
Diebold, "Diebold Deploys First ATM Without Card Reader or PIN Pad," http://news.dieboldnixdorf.com/press-releases/diebold-deploys-first-atm-without-card-reader-or-pin-pad.htm, Mar. 20, 2014, 2 pages.
Seifert, Julian et al., Don't Queue Up! User Attitudes Towards Mobile Interactions with Public Terminals, https://www.researchgate.net/publication/237006908_Don't_queue_up_User_attitudes_towards_mobile_interactions_with_public_terminals, Dec. 3, 2012, 4 pages.
Claycomb, William R. et al., "Secure Real World Interaction Using Mobile Devices," http://citeseerx.ist.psu.edu/viewdoc/summary?doi=10.1.1.93.9290, 2006, 11 pages.
Pous et al., "Enhancing accessibility: mobile to ATM case study," http://ieeexplore.ieee.org/document/6181024/, Jan. 14, 2012, 5 pages.
Arnfield, Robin, "ATM and Mobile 101," https://www.google.com/url?sa=t&rct=j&q=&esrc=s&source=web&cd=1&ved=0ahUKEwi7-qm-9OTPAhVJ2yYKHX93BvkQFggeMAA&url=http%3A%2F%

(56) References Cited

OTHER PUBLICATIONS

2Fnmgprod.s3.amazonaws.com%2Fmedia%2Ffiler_public%2F80%2F68%2F8068b06a-e0fc-4080-b9f1-a369e993af6a%2Fatm_mobile_101_amc_final.pdf&usg=AFQjCNH_fZMjPU-VM-er_E6LP9iT0tFpwQ&sig2=porQAvlp_kVhCTtBRDS7fg, 2015, 14 pages.

Chiraag, Withdraw cash at an ATM not through your card but through your smartphone, Oct. 11, 2013, 2 pages.

U.S. Appl. No. 14/151,974, filed Jan. 10, 2014, entitled Augmented Reality Security Applications.

U.S. Appl. No. 14/796,148, filed Jul. 10, 2015, entitled Augmented Reality Security Applications.

\* cited by examiner

AUGMENTED REALITY SECURITY APPLICATIONS

BACKGROUND

Augmented reality is a technology in which a person's conception of reality can be enhanced, typically through augmented sound, video or graphics displays. The augmentation is typically implemented via various technologies, such as a headset that may be worn by the person. One or more augmented views may be presented to the person through the headset.

The augmented reality headset typically includes a wearable computer and an optical display mounted to the headset. The wearable computer may include a wireless telecommunication capability, permitting a wireless connection from the wearable computer to a server computer. Because of the wireless telecommunication capability, the augmented reality headset may be used to interact with the server computer to accomplish various tasks.

SUMMARY

Embodiments of the disclosure are directed to a method implemented on an augmented reality (AR) electronic device comprising: at the AR device, establishing a wireless connection with an automated teller machine (ATM); using the AR electronic device, authenticating a user of the AR electronic device at the ATM; permitting initiation of a financial transaction through using user interface functionality for the ATM that is displayed on the AR electronic device; and displaying financial information for the financial transaction on a display screen of the AR electronic device, instead of displaying the financial information at the ATM.

In another aspect, a method implemented on an AR electronic device comprises: at the AR electronic device, pre-authenticating a user of the AR electronic device to access an ATM; at the AR electronic device, after the user is pre-authenticated at the ATM, at a user interface on the AR electronic device, permit initiation of a transaction to dispense cash at the ATM; and when the AR electronic device is in close proximity to the ATM, enabling the ATM to dispense the cash to the user, wherein personal and confidential information regarding the transaction are displayed on the AR electronic device, instead of the ATM.

In yet another aspect, an AR electronic computing device comprises: a processing unit; and system memory, the system memory including instructions which, when executed by the processing unit, cause the AR electronic computing device to: establish a wireless connection between the AR electronic computing device and an automated teller machine (ATM); while the wireless connection is established, pre-authenticate a user of the AR electronic computing device to access the ATM, the user being permitted to be pre-authenticated to access the ATM when the user is not close to the ATM; after the user is pre-authenticated at the ATM, at a user interface of the AR electronic computing device, permit an initiation of a financial transaction for obtaining cash at the ATM, the user interface including functionality for using the ATM; after the user is pre-authenticated at the ATM, receive at a user interface of the AR electronic computing device an initiation of a financial transaction for obtaining cash at the ATM, the user interface including functionality for using the ATM; after the financial transaction is initiated, when a notification is received that the financial transaction can have a negative impact on a budget of the user, display on the user interface of the AR device a message that an affirmative response is required of the user before the financial transaction can be completed; and when the financial transaction is completed, when the AR electronic computing device is positioned close to the ATM, enable the ATM to dispense the cash to the user based on the financial transaction, wherein details of the financial transaction are displayed on AR electronic device, instead of the ATM.

The details of one or more techniques are set forth in the accompanying drawings and the description below. Other features, objects, and advantages of these techniques will be apparent from the description, drawings, and claims.

DESCRIPTION OF THE DRAWINGS

FIG. 3 shows an example system for which AR may be used to identify wanted or undesirable individuals in a retail environment.

DETAILED DESCRIPTION

Figure 1:
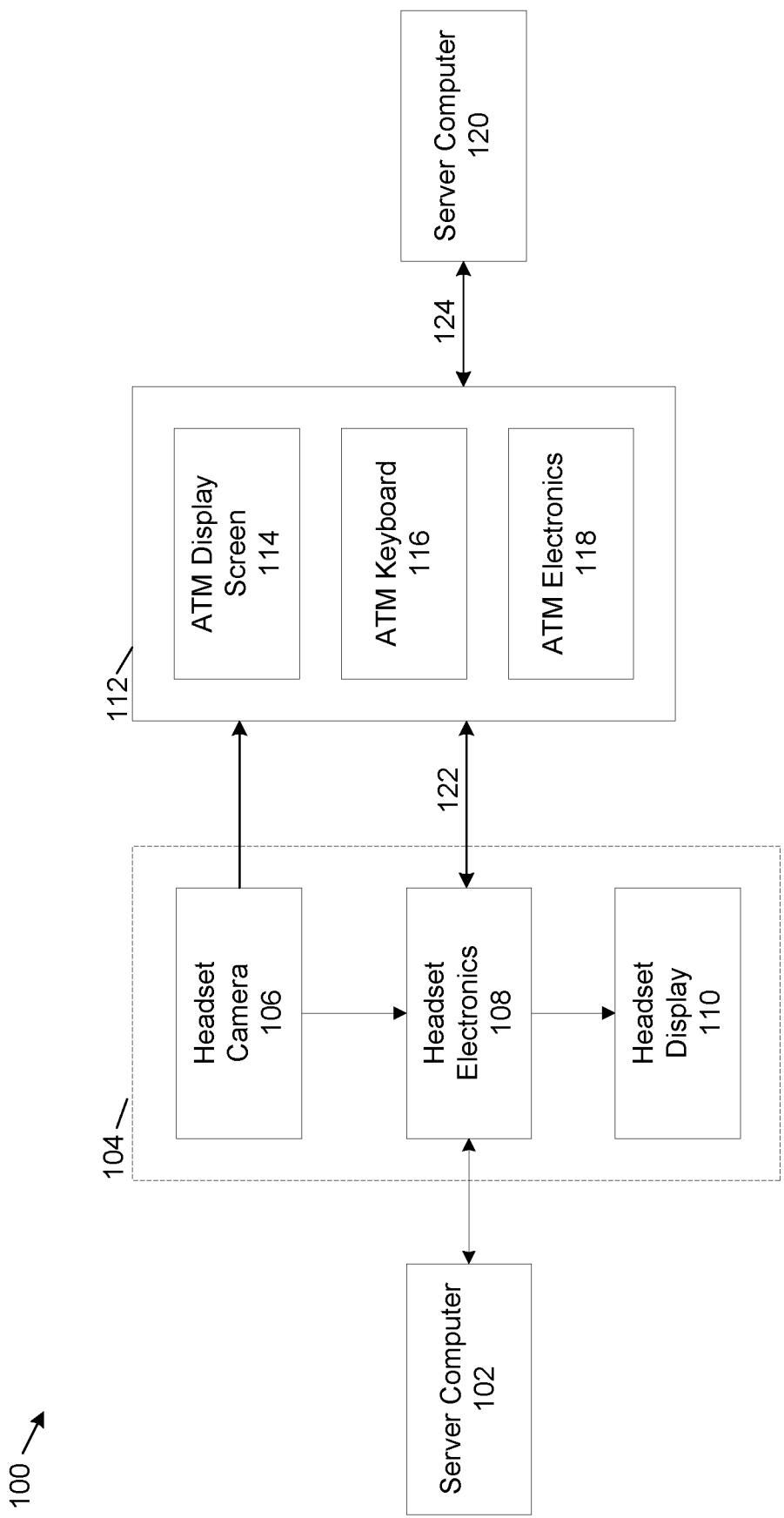
FIG. 1 shows an example system for which augmented reality (AR) may be used to enhance security applications.

The present disclosure is directed to systems and methods for using augmented reality (AR) to help conduct secure financial transactions, particularly at an automated teller machine (ATM) and for using AR in a banking or retail environment to alert security personnel of sightings of "wanted" individuals. The "wanted" individuals may be known bank or ATM robbers or may be individuals of high risk to a banking or retail organization.

In an example implementation, a user may conduct a financial transaction at an ATM machine without having financial information displayed on an ATM display screen. Instead, financial information regarding the financial transaction is displayed on a display screen of the AR device. By displaying financial information on the display screen of the AR device and not on the ATM display screen, the financial transaction may be more secure. For example, other individuals who may be near the ATM display screen, for example people waiting in line to use the ATM, are not able to see the financial information of the financial transaction. Only the user of the AR device is able to see the financial information.

In another implementation relating to identifying wanted or undesirable individuals, when a person wearing an AR device enters a bank or retail store, the AR device may synchronize with a bank security system or a retail store security system. As the person walks around in the bank or retail store, images of individuals viewed via a camera in the AR device may be sent to the bank security system or retail store security system. The images may be compared at the bank security system or retail store security system with images of wanted or undesirable individuals. When a match is found, security personnel in the bank or retail store may be alerted.

In yet another implementation, a greeter or other employee of a bank or retail store may use an AR device to identify wanted or undesirable individuals. For example, if the greeter is wearing an AR device, as the greeter greets people entering the bank or retail store, an image of the person being greeted is sent to the bank security system or retail store security system. The bank security system or retail store security system may determine, for example, that the individual is wanted for a crime such as bank robbery or that the individual has a record of stealing items from the retail store. The bank security system or retail store security system may issue an alert that may be displayed on a display screen of the AR device. The alert may inform the greeter that there is a wanted individual in the bank or retail store and may display instructions as how to proceed, for example by activating an alarm or calling 911.

The systems and methods are generally described for an AR headset that may be worn by a user. The AR headset includes a wearable computer, a camera and an optical display. The wearable computer includes a wireless telecommunication capability, permitting a wireless connection between the wearable computer and one or more server computers. The wearable computer also includes voice recognition capability, permitting the user to direct the wearable computer via voice commands. In addition, in some implementations, the wearable computer also includes biometric capability such as facial recognition, retinal scan capability, finger print and voice print capability. The biometric capability permits biometric authentication of the user, as described in more detail later herein.

One type of AR headset described in this disclosure is a smart glass type of headset, similar to eyeglasses, which may be worn by a user. The user may view AR images in the glass portion of the headset. An example of a smart glass headset is Google Glass, from Google Inc. of Mountain View, Calif.

The systems and methods are also described for a mobile electronic device, such as a smart telephone or laptop computer, having an AR software application. The smart telephone and laptop computer each includes a camera that may be used to view individuals in a bank or retail organization. The AR software application may permit an initiation of a financial transaction at an ATM machine using voice commands. The AR software application may also provide one or more methods of biometric authentication of the user of the mobile electronic device. In addition, financial information related to the financial transaction may be overlaid on a display screen of the mobile electronic device.

FIG. 1 shows an example system 100 for which AR may be used to enhance security applications. The example system 100 includes a server computer 102, an AR headset 104, an ATM 112 and a server computer 120. The example AR headset 104 includes a headset camera 106, headset electronics 108 and a headset display 110. The ATM 112 is a typically located inside a bank or near a bank. However, the ATM may also be located elsewhere, for example in a shopping mall, an airport, etc.

The example server computer 102 is typically a server computer at a bank or banking organization. A wireless connection 122 may be established between the AR headset 104 and the server computer 102. Information may be exchanged via a wireless connection 122 between the AR headset 104 and the server computer 102. One type of information that may be exchanged between the AR headset 104 and the server computer 102 is biometric authentication information that may be used to authenticate a user of the AR headset 104, as explained in more detail later herein.

The server computer 120 is also typically a server computer at a bank or banking organization. In some implementations, server computer 102 and server computer 120 are the same server computer. In other implementations, server computer 102 and server computer 120 are different server computers. The server computer 120 is accessible from the ATM 112 and processes transactions at the ATM 112. Information relating to a financial transaction from the ATM 112 may be transmitted to server computer 120. Financial information generated by server computer 120 may be transmitted to the ATM 112 and then from the ATM 112 to AR headset 104.

The example AR headset 104 includes a headset camera 106, headset electronics 108 and a headset display 110. The example headset camera 106 is a camera that is typically mounted to the headset such that a lens of the camera has a same orientation as the user. When the user looks at an object or a scene, the camera is positioned to record or transmit what the user sees. The headset electronics 108 includes an electronic computing device with wireless capability. The wireless capability may include Bluetooth or a similar type of wireless capability. The headset electronics 108 may also include optical character recognition (OCR).

The ATM 112 includes an ATM display screen 114, an ATM keyboard 116 and ATM electronics 118. The ATM electronics 118 also includes an electronic computing device with wireless capability. The wireless capability may include Bluetooth or a similar type of wireless capability.

In an example implementation, a user wearing the AR headset 104 approaches the ATM 112. When the user comes within a predetermined distance of the ATM 112, for example several feet, a wireless connection 124 is initiated between the AR headset 104 and the ATM 112. The wireless connection may be initiated via a Bluetooth communication protocol or via a similar type of wireless communication protocol.

When the ATM 112 is not being used by another individual, the user initiates a financial transaction at the ATM 112. In some implementations, the user may initiate the financial transaction by inserting an ATM card into a card reader of the ATM 112. In this implementation, the user typically enters a personal identification number (PIN) via ATM keyboard 116. The PIN authenticates the user at the ATM 112. After the user is authenticated, the user may select a transaction, for example withdrawing money from the user's checking account, via the ATM keyboard 116. However, in this implementation, some or all messages regarding the financial transaction that may usually be displayed on the ATM display screen 114 are instead displayed on the headset display 110.

For example, financial information such as the user's account balance is displayed on headset display 110. In some implementations, the ATM display screen 114 is blank when the financial information is displayed on the headset display 110. In other implementations, the ATM display screen 114 displays other information, such as marketing information, instead of the user's financial information. In this way, only the user can see the financial information (via the headset display 110). Other people near the ATM, such as people waiting in line, are not able to see the financial information.

In another example implementation, when the ATM 112 is not being used by another individual, the user may be authenticated by a biometric authentication method such as a facial scan, retinal scan, finger print scan or voice print. When the user is authenticated by the biometric authentication method, the user no longer needs to enter a PIN via ATM keyboard 116 in order to be authenticated. However, in order to give the user a sense of security regarding use of the ATM 112, the user is typically asked to enter a security code into the ATM 112. The security code is sent from server computer 120 and displayed on headset display 110 after the user is authenticated. In this implementation, after the user enters the displayed security code into ATM 112 and the security code is validated at the server computer 120, the user is enabled to initiate a financial transaction. For example, a list of available financial transactions may be displayed on the headset display 110. In addition, because this implementation uses biometric authentication and a security code, an actual ATM card may not need to be used.

In some situations, a user may approach the ATM 112 and find that the ATM is currently being used by another person. In some situations, there may also be a line of people waiting ahead of the user. In these situations, when the user is wearing the AR headset 104 and the user is within the predetermined distance to the ATM 112, the wireless connection 124 may still be established between the AR headset 104 and server computer 120. The user may be still be authenticated using a biometric authentication method and a security code may still be displayed on the headset display 110 of the user, but the user is not able to complete an execution of a financial transaction at the ATM 112. In some implementations, the user may be able to utter the security code to fully authenticate the user. Once the user is fully authenticated, the user may be able to initiate, but not fully execute financial transactions. Instead, the user may be able to initiate one or more transactions and have the transactions queued at the server computer 120 until such time as the ATM 112 becomes available. In this way, the user can complete the transactions faster at the ATM 112 when the ATM 112 becomes available.

Figure 2:
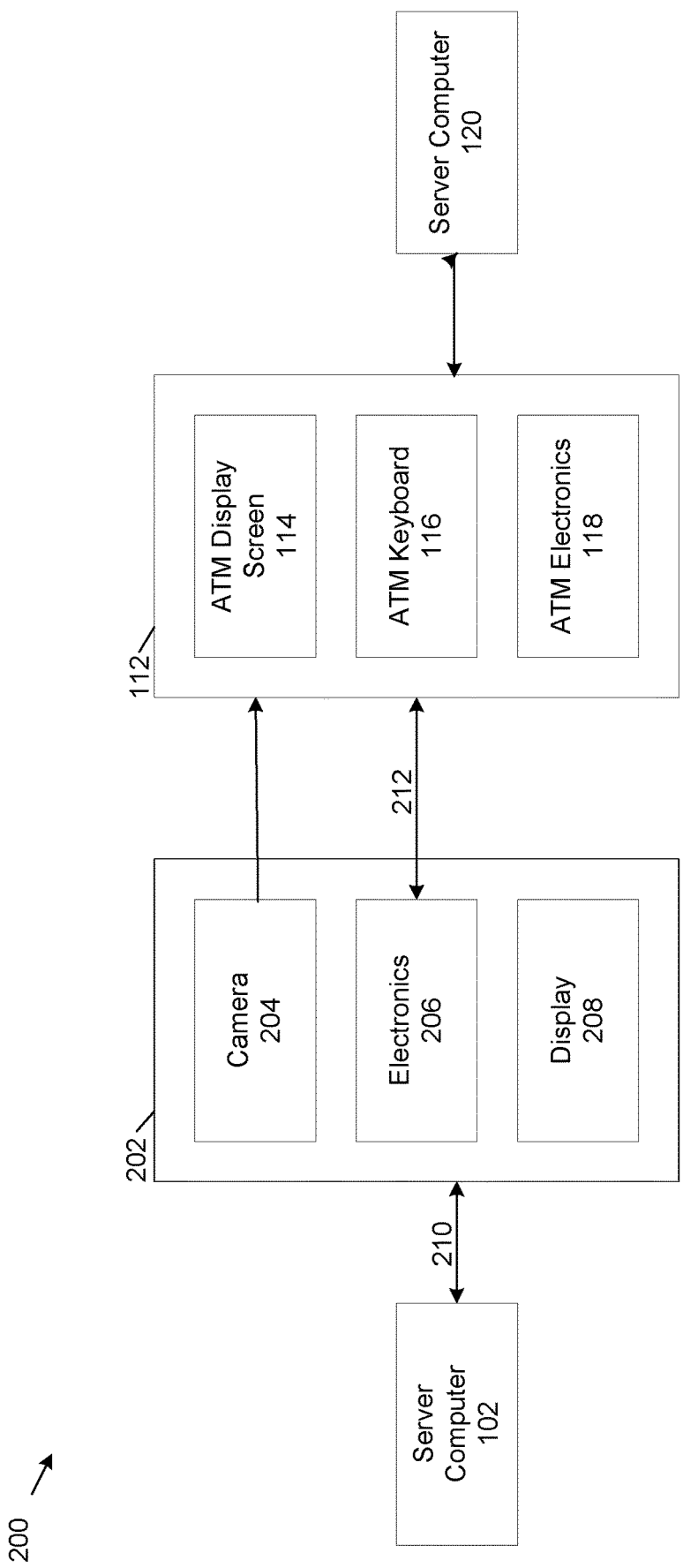
FIG. 2 shows another example system for which AR may be used to enhance security applications.

FIG. 2 shows another example system 200 for which AR may be used to enhance security applications. For the example system 200, a mobile electronic computing device with an AR software application is used instead of an AR device. The mobile electronic device is typically a smart telephone or a tablet computer.

The example system 200 includes server computer 102, mobile electronic device 202, ATM 112 and server computer 120. The mobile electronic device 202 is typically a smart telephone or a tablet computer. The mobile electronic device 202 includes camera 204, electronics 206 and display 208. The electronics 206 includes an electronic computing device with wireless capability. The wireless capability may include Bluetooth or a similar type of wireless capability.

In system 200, a wireless connection 210 may be established between the mobile electronic device 202 and server computer 102. Another wireless connection 212 may be established between the mobile electronic device 202 and the ATM 112. The wireless connection 210 may be used to authenticate the user of the AR headset via a biometric authentication method. The wireless connection 212 may be used to transmit financial transaction information between the mobile electronic device 202 and the ATM 112.

In an example implementation using system 200, when a user with mobile electronic device 202 comes within a predetermined distance from the ATM 112 and the user has initiated a mobile banking application on the mobile electronic device 202, the wireless connection 212 is established between the mobile electronic device 202 and the ATM 112.

At some point either before the wireless connection 212 is fully established or after the wireless connection 212 is established, the user is authenticated. In some implementations the user is authenticated via a biometric authentication method. In these implementations biometric authentication typically is achieved via sending biometric information to server computer 102 and obtaining an indication of biometric authentication from server computer 102. The biometric information may be obtained, for example, by using the camera 204 to focus on the face of the user. A facial scan or retinal scan may then be performed on the image of the face using an AR software application on the mobile electronic device 202. Server computer 102 compares information regarding the facial scan or retinal scan with facial and retinal information previous stored on server computer 102 or accessible from server computer 102. When a match occurs, server computer 102 generates an indication of biometric authentication.

The indication of biometric authentication is then sent to server computer 120 via wireless connection 212 and ATM 112. In some implementations, biometric authentication may be performed via server computer 120 instead of via server computer 102. In other implementations, authentication is implemented by the user entering a PIN into ATM 112.

When server computer 120 receives the financial transaction information from the ATM 112, server computer 120 processes the transaction. Server computer 120 may then send additional financial information related to the financial transaction to ATM 112. The additional financial information may include such items as a confirmation number for the transaction, an account balance, etc. In the example implementation using system 200, when ATM 112 receives the additional financial information, ATM 112 sends the additional financial information via wireless connection 212 to mobile electronic device 202. The additional financial information is displayed on display 208 instead of on ATM display screen 114.

Figure 3:
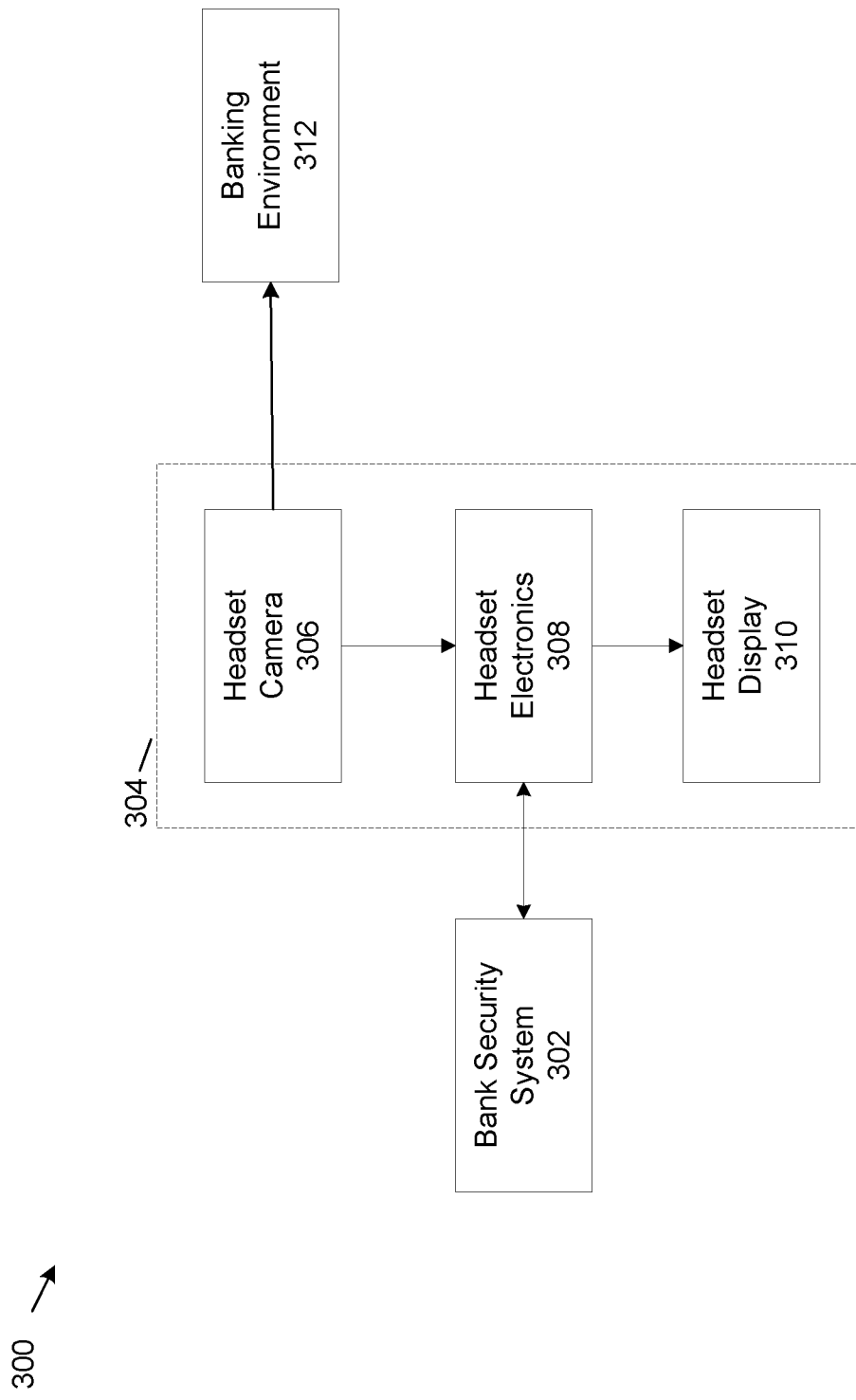
FIG. 3 shows an example system for which AR may be used to identify wanted or undesirable individuals in a bank.

FIG. 3 shows an example system 300 for which AR may be used to identify wanted or undesirable individuals in a bank. The system 300 may also be used in a retail store in addition to a bank.

The example system 300 includes a bank security system 302, an AR headset 304 and banking environment 312. The bank security system 302 comprises one or more electronic devices in the bank or accessible from the bank. The electronic devices may include one or more computing devices including server computers. The AR headset 304 includes a headset camera 306, headset electronics 308 and a headset display 310. The banking environment 312 includes individuals that may be in a particular bank. The individuals may include banking customers, bank employees and any other people that may be in the bank.

When a customer wearing the AR headset 304 enters the bank, the AR headset 304 is synchronized with the bank security system 302. When the customer moves around the bank, the headset camera 306 sends images of what the customer sees to the bank security system 302. The bank security system 302 compares the images to stored images of known wanted or undesirable people. For example, the wanted or undesirable people may include known criminals, including bank robbers, people otherwise wanted by law enforcement organizations, people with a history of causing problems at the bank or other locations, etc. The images may be stored at the bank security system 302 or on a data store accessible from the bank security system 302.

When a determination is made at the bank security system 302 that an undesirable person is in the bank, the bank security system may send an alert to the AR headset 304. The alert is displayed on headset display 310.

Figure 4:
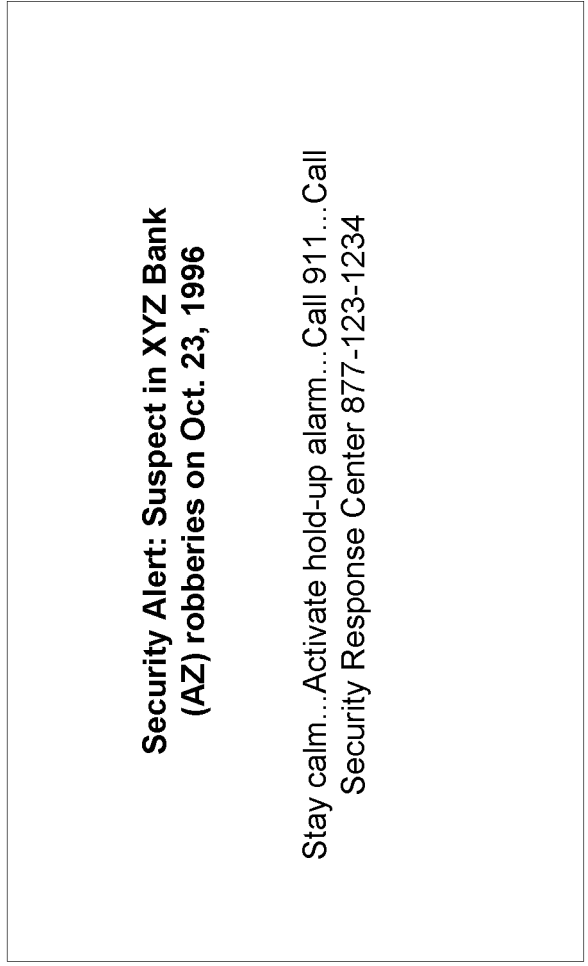
FIG. 4 shows an alert that may be displayed on the AR headset of FIG. 1.

FIG. 4 shows an example alert 400 that may be displayed on AR headset 304. The alert 400 indicates that there is a suspect in the XYZ Bank and that the suspect committed robberies on Oct. 23, 1996. The alert also displays example instructions for the user of the AR headset 304. As shown in FIG. 4, the user is instructed to stay calm, activate a hold-up alarm, call 911 and call a security response center. Other example alerts are possible.

Figure 5:
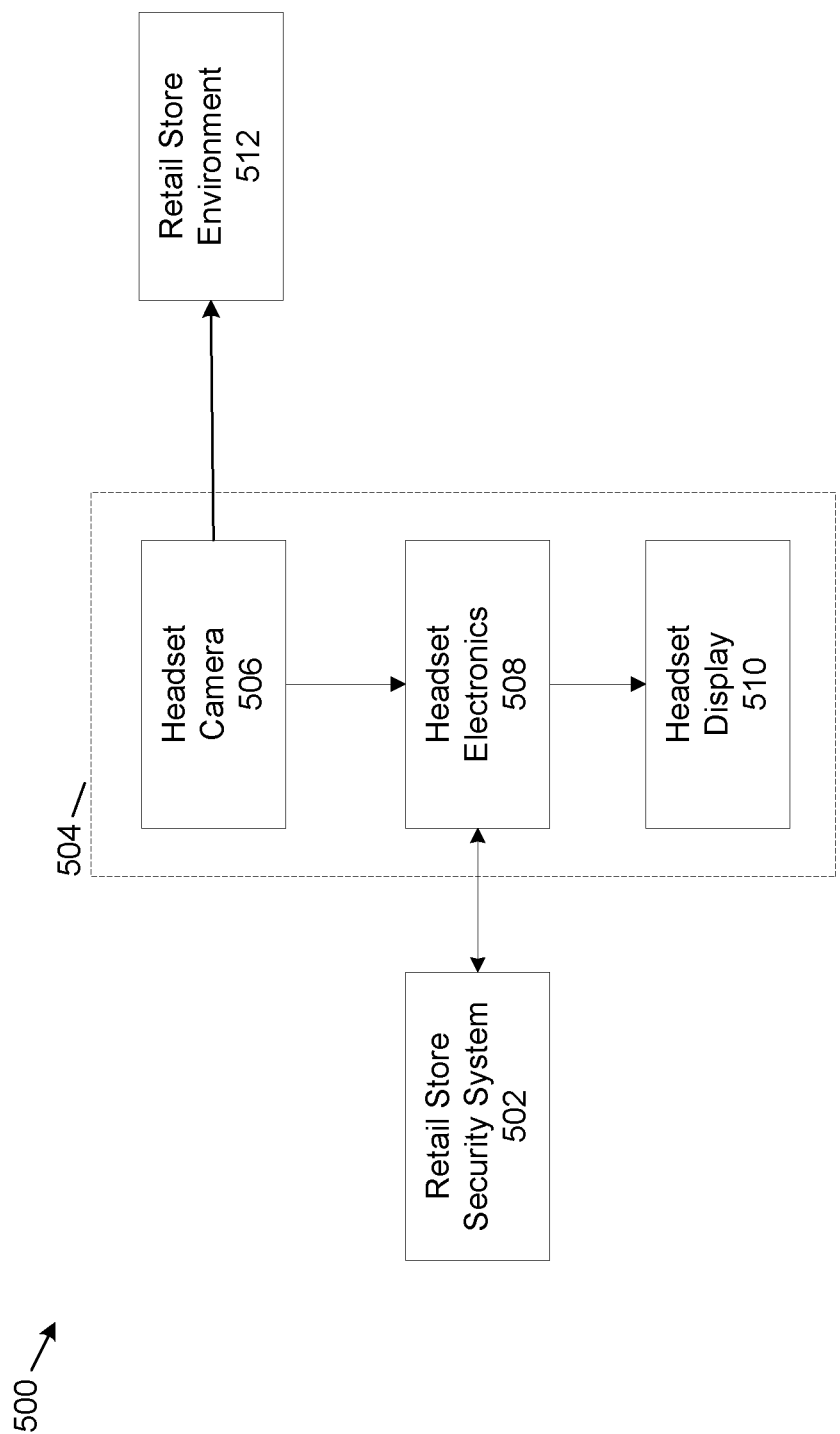
FIG. 5 shows an example

FIG. 5 shows a system 500, similar to system 300 that may be used in a retail environment instead of in a bank. The system 500 includes a retail store security system 502 instead of bank security system 302 and a retail environment 512 instead of the banking environment 312. For example, a customer wearing AR headset 504 in a retail store may send images of people in the retail store to the retail store security system 502. The retail store security system 502 compares the images to images of known wanted persons stored at the security system. When a match occurs, the retail store security system sends an alert to the customer's AR headset 504. The retail store security system may take other action, such as notifying retail store security personnel or notifying law enforcement.

The system 500 may also be used by a greeter in a retail store to issue security alerts. For example, the greeter may wear AR headset 504. When the greeter greets an individual entering the retail store, camera 506 of the AR headset 504 may scan the face of the individual. The scanned image of the individual's face may then be sent to the retail store security system 502. The retail store security system 502 compares the image with stored images of known wanted persons or persons that the retail store considers as undesirable. For example, an undesirable person may be a person having a history of disruptive behavior in the retail store, including such behaviors as theft of merchandise and rowdiness.

When the retail store security system 502 determines that a wanted or undesirable person is in the retail store, the retail store security system may issue an alert. The alert may be displayed on the headset display 510 of the AR headset 504 to alert the greeter that there is a wanted or undesirable person in the retail store. The alert may also be sent to retail store security personnel and law enforcement.

Figure 6:
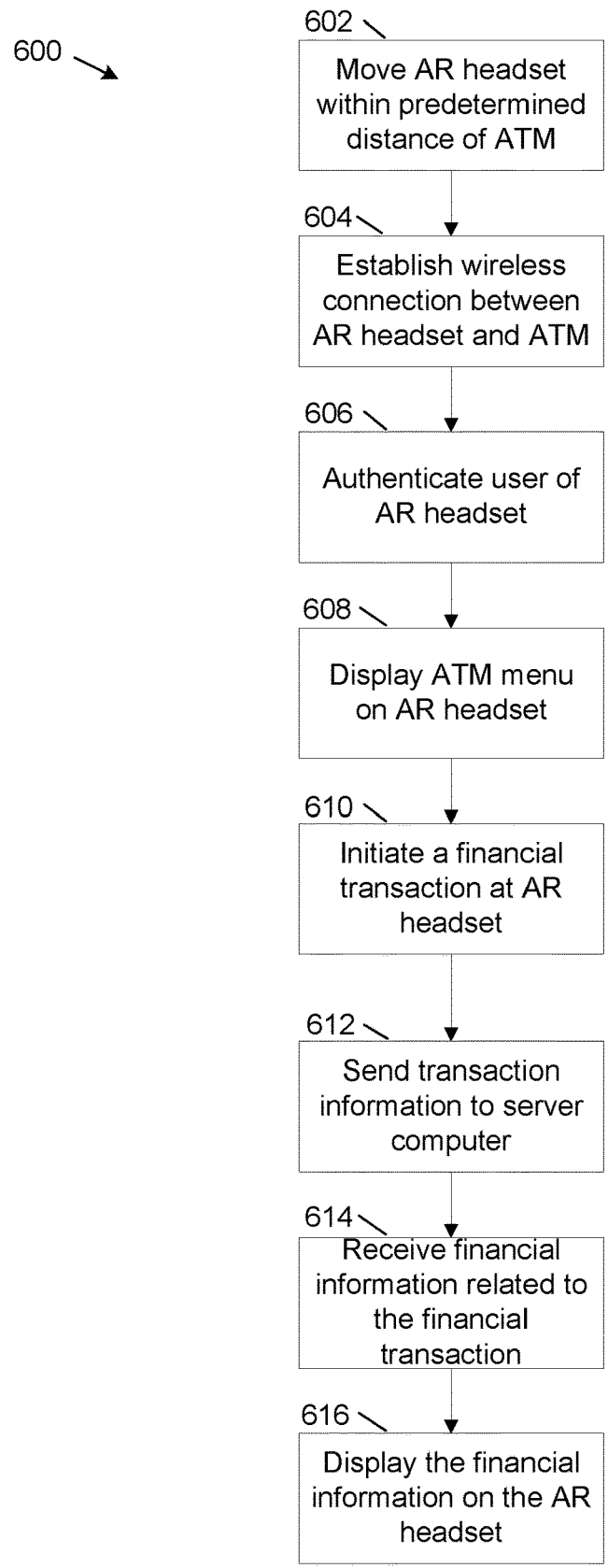
FIG. 6 shows a flowchart for an example method for displaying automatic teller machine (ATM) information on the AR headset of FIG. 1.

FIG. 6 shows a flowchart of a method 600 for displaying ATM transaction information on an AR headset. The AR headset 104 is used for this method.

At operation 602, the AR headset 104 is moved to a close proximity of an ATM, in this method ATM 112. Moving the AR headset 104 to close proximity of ATM 112 comprises moving the AR headset 104 to within a predetermined distance of ATM 112. The predetermined distance is a distance close enough so that a Bluetooth communication protocol is activated on the AR headset 104 and on the ATM 112. In method 600, the predetermined distance is 10 feet, although in other implementations a range of up to about 10 meters (about 32 feet) may be used.

At operation 604, a wireless connection is established between the AR headset 104 and the ATM 112. For method 600, a Bluetooth connection is established. Because the ATM 112 has a connection to a server computer, for example server computer 120, once the wireless connection is established between AR headset 104 and ATM 112, information can be transmitted between AR headset 104 and server computer 120.

At operation 606, the user of AR headset 104 is authenticated. In the example method 600, the authentication is implemented by a biometric authentication method such as facial recognition, retinal scan, finger print scan or voice print. In other methods, a manual authentication method such as a PIN may be used. For the method 600, the authentication is implemented via a wireless connection between AR headset 104 and server computer 102. In this implementation, server computer 102 includes AR software that permits biometric authentication. In this implementation, server computer 120 is dedicated to serving one or more ATM machines and does not include support biometric authentication.

At operation 608, a menu of ATM choices is displayed on the AR headset. The menu of ATM choices is similar to a menu that may be displayed on the ATM display screen 114. For example, the menu may display choices such as receive cash or make a deposit, etc.

At operation 610, a financial transaction is initiated at the AR headset. The financial transaction is typically a common ATM transaction such as receiving cash or depositing a check. The transaction may be initiated by selecting from the menu of choices displayed on the AR headset or by uttering the name of a transaction item—such as "receive cash" or "deposit check." In other implementations, the user may use a keypad on the ATM 112 to initiate the financial transaction.

At operation 612, the transaction information is sent to server computer 120. For example, if the user decides to receive cash in an amount of $100, a message containing information related to a cash withdrawal of $100 from the user's checking account is sent to server computer 120. When the user initiates the financial transaction from the AR headset 104, the information is sent from the AR headset 104 via the Bluetooth connection to the ATM 112 and then from ATM 112 to server computer 120. When the financial transaction is initiated from the ATM 112, the information is sent from ATM 112 to server computer 120.

At operation 614, financial information related to the financial transaction is received at the AR headset 104. The financial information is sent by server computer 120, received at ATM 112 and sent via the Bluetooth connection to ATM 112. The financial information may include such items as a confirmation that the financial transaction has been completed, an account balance, a receipt, etc. Other types of financial information are possible.

At operation 616, the financial information is displayed on headset display 110 of the AR headset 104.

Figure 7:
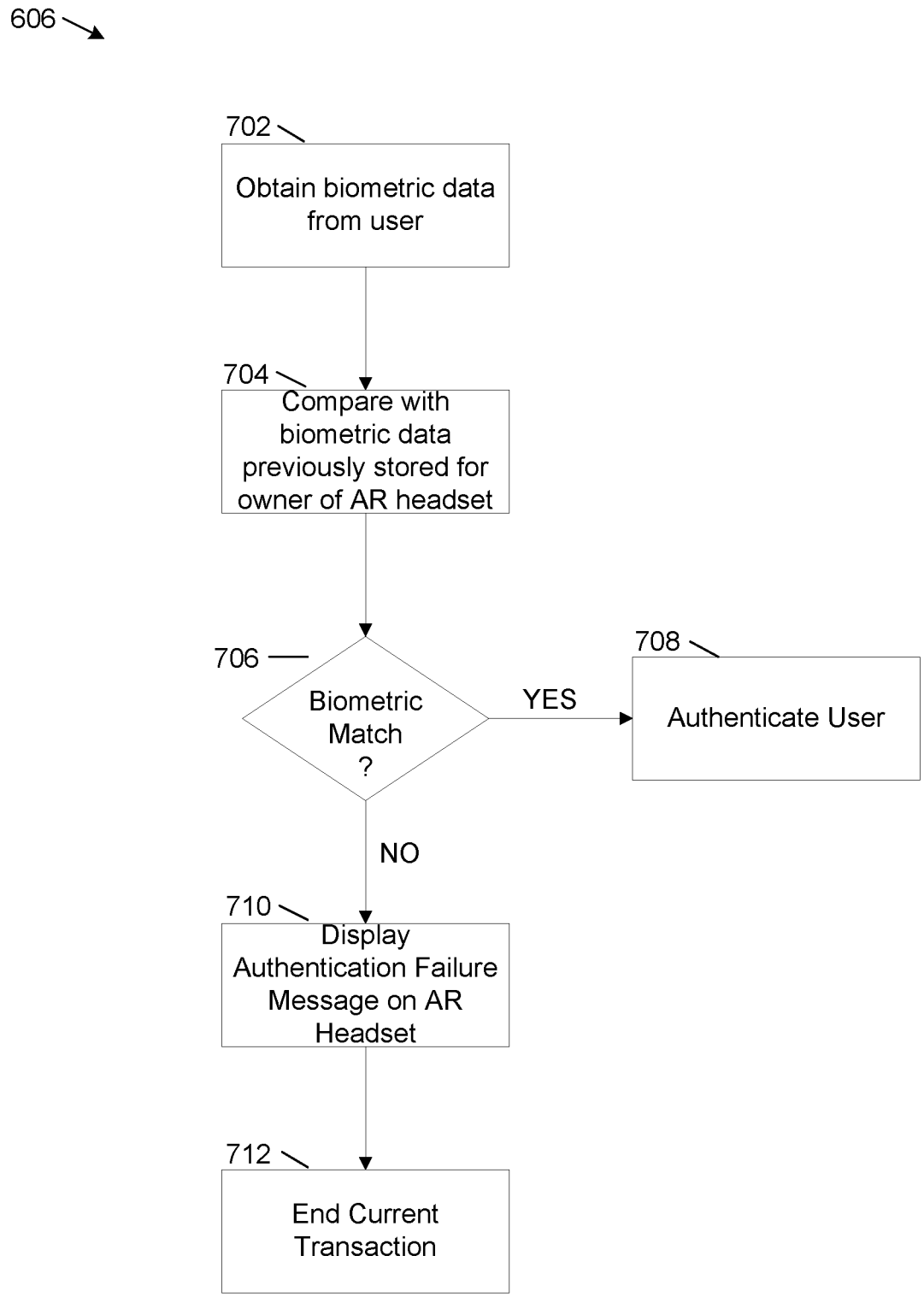
FIG. 7 shows a flowchart of an example method for authenticating a user.

FIG. 7 shows a flowchart of a method for the operation 606 for authenticating the user. At operation 702, biometric information is obtained from the user. Typically, the biometric information is obtained from one of facial recognition, retinal scan, voice print or finger print scan. Facial recognition comprises scanning the user's face with the headset camera 106 and extracting specific facial features from the scanned image of the user's face. Retinal scan uses unique patterns on the user's iris in order to identify the user. Voice print obtains a spectrogram of the user's voice, for example when the user utters a command. Finger print scan uses finger print recognition to identify the user. In some implementations, finger print recognition hardware and software are built into the AR device. For example, when the user touches the headset display 110, the user's finger print may be scanned.

At operation 704, the biometric information for the user obtained at operation 702 is compared with previously obtained biometric information for the user. Typically, when the user is assigned an AR device, a biometric profile is compiled for the user and stored on the AR device. The profile may include one or more of a facial profile, a retinal profile, a voice print and a finger print.

At operation 706, a determination is made as to whether the biometric information obtained at operation 702 matches the previously obtained biometric information for the user. When a determination is made that there is a match, at operation 1008, the user is designated as being authenticated.

When a determination is made that there is not a match, at operation 710, a message is displayed on the headset display 110 indicating that there is an authentication failure.

Figure 8:
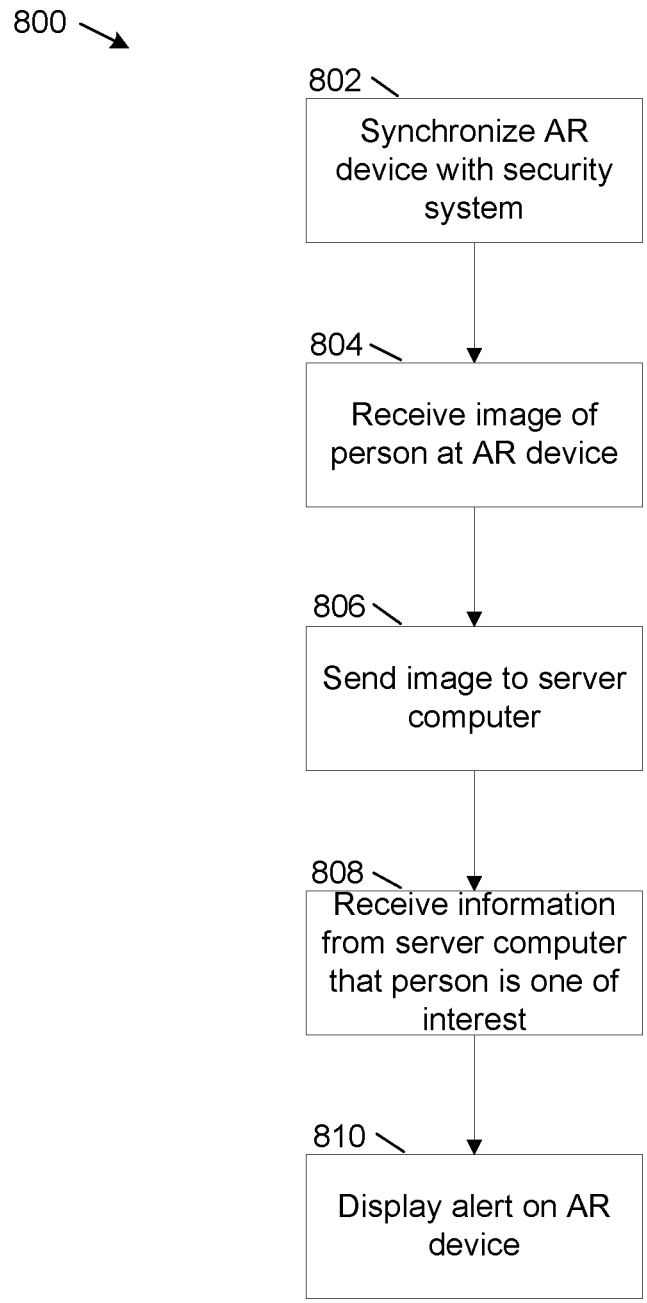
FIG. 8 shows a flowchart of an example method for displaying a security alert on the AR device of FIG. 1.

FIG. 8 shows a flowchart of a method 800 for displaying a security alert on an AR device. For this method, the AR device is the AR headset 104. The method 800 may apply to a variety of environments, including a banking environment and a retail environment.

In method 800, a user who is wearing the AR headset 104 is in an environment such as a bank or retail store with customers of the bank or retail store. The bank or retail store has a security system, such as bank security system 302 or retail store security system 502. At operation 802, the AR device is synchronized with the bank security system 302, the retail store security system 502 or another security system, as the case may be.

The user may be a customer or employee at a bank, a greeter in a retail store, an employee at the retail store, etc. As the user walks around the bank or retail store, headset camera 106 scans images of people in the bank or retail store with whom the user comes in contact. At operation 804, the user receives a scanned image of a person at the AR headset 104.

At operation 806, the image is sent to a server computer, for example server computer 102. Server computer 102 is a server computer, typically at a financial institution or retail business. The AR headset has access to server computer 102 via a wireless connection.

At operation 808, information is received from the server computer 102 that the person whose image was sent to server computer 102 is a person of interest. The person of interest is typically a person that is wanted by the bank or retail institution or one who is considered undesirable by the bank or retail institution. For example, the person may be a known criminal, such as a bank robber or a person that has previously caused a problem at the retail institution. The server computer 102 determines that the person is one of interest by comparing the scanned image of the person with images of people who are wanted or undesirable. The images being compared are typically compiled by the bank, the retail store or law enforcement agencies.

At operation 810, an alert is displayed on the AR headset 104. The alert informs the user that the person is a person of interest and typically provides a message as to why the person may be wanted by the bank or retail institution. The alert may also provide instructions to the user, such as remain calm, call 911, etc.

Figure 9:
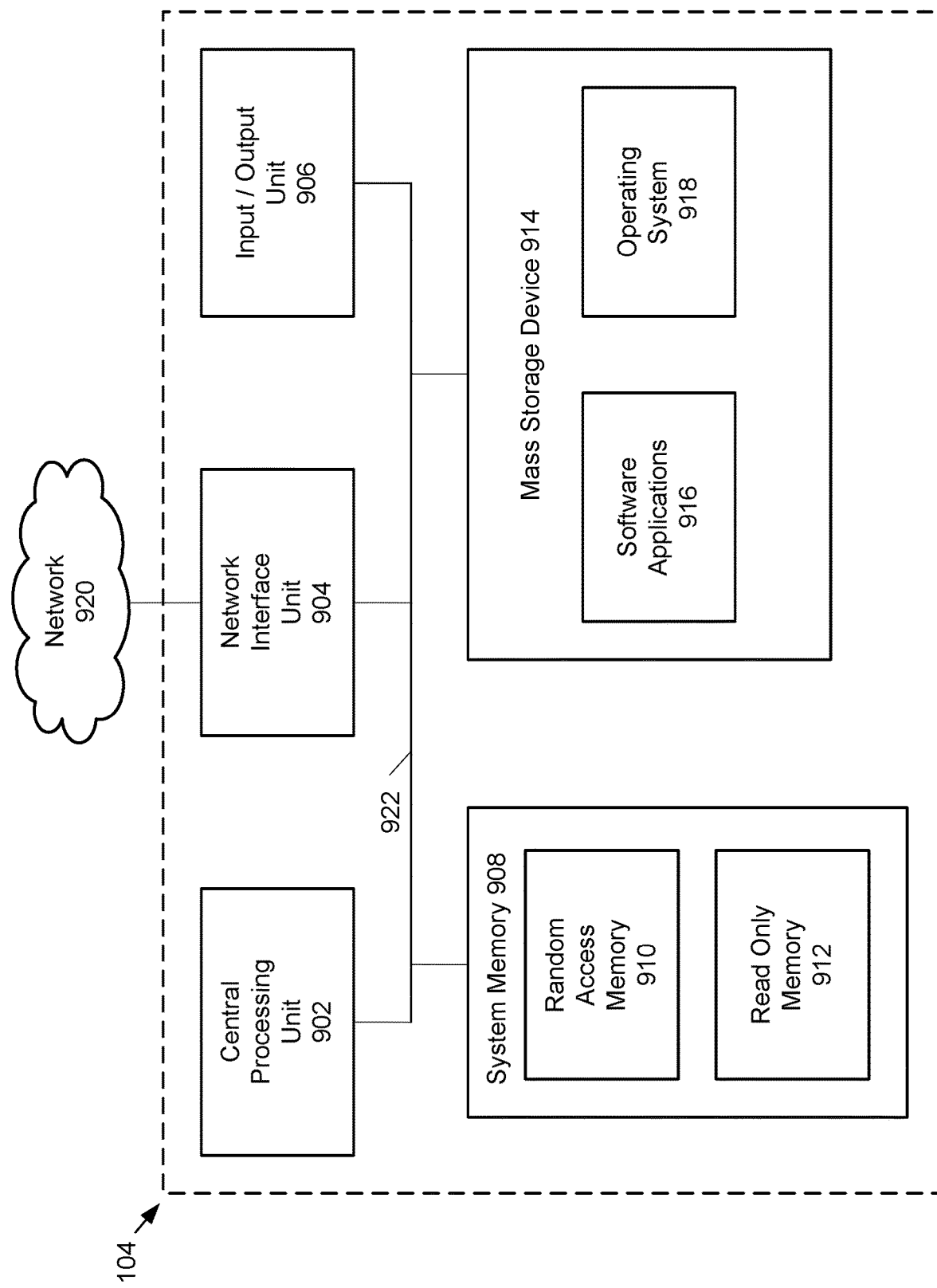
FIG. 9 shows example physical components of the AR headset of FIG. 1.

As illustrated in the example of FIG. 9, the AR headset 104 includes at least one central processing unit ("CPU") 902, a system memory 908, and a system bus 922 that couples the system memory 908 to the CPU 902. The system memory 908 includes a random access memory ("RAM") 910 and a read-only memory ("ROM") 912. A basic input/output system that contains the basic routines that help to transfer information between elements within the AR headset 104, such as during startup, is stored in the ROM 912. The AR headset 104 further includes a mass storage device 914. The mass storage device 914 is able to store software instructions and data. A central processing unit, system memory and mass storage device similar to that in FIG. 9 are also included in server computer 102.

The mass storage device 914 is connected to the CPU 902 through a mass storage controller (not shown) connected to the system bus 922. The mass storage device 914 and its associated computer-readable data storage media provide non-volatile, non-transitory storage for the AR headset 104. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the server computer 102.

According to various embodiments of the invention, the AR headset 104 may operate in a networked environment using logical connections to remote network devices through the network 920, such as a wireless network, the Internet, or another type of network. The AR headset 104 may connect to the network 920 through a network interface unit 904 connected to the system bus 922. It should be appreciated that the network interface unit 1404 may also be utilized to connect to other types of networks and remote computing systems. The AR headset 104 also includes an input/output controller 906 for receiving and processing input from a number of other devices, including a touch user interface display screen, or another type of input device. Similarly, the input/output controller 906 may provide output to a touch user interface display screen or other type of output device.

As mentioned briefly above, the mass storage device 914 and the RAM 910 of the AR headset 104 can store software instructions and data. The software instructions include an operating system 918 suitable for controlling the operation of the AR headset 104. The mass storage device 914 and/or the RAM 910 also store software instructions, that when executed by the CPU 902, cause the AR headset 104 to provide the functionality of the AR headset 104 discussed in this document. For example, the mass storage device 914 and/or the RAM 910 can store software instructions that, when executed by the CPU 902, cause the AR headset 104 to display received financial data on the display screen of the AR headset 104.

In other embodiments, the systems and methods described herein can be used with an ATM that lacks a graphical user interface. Instead, the AR device can include a user interface that provides the functionality of an ATM. The user can be pre-authenticated for the ATM at the AR device and/or can initiate financial transactions with the ATM using the user interface on the AR device.

In these examples, the ATM can be entirely without a graphical user interface. In such a scenario, all interaction between the user and the ATM is performed through the AR device. In other examples, the ATM can include a user interface that displays non-confidential information to the user. Such an interface could provide information like advertisements, confirmations of transactions, etc. Other such configurations are possible. Personal and confidential information regarding financial transactions made by the user can be displayed on the AR device instead of on the ATM.

In example embodiments, personal and confidential information can take a variety of forms. As used in this disclosure, personal information can be any factual or subjective information about the user and about family members of the user. Factual information for the user and family members of the user can include names, addresses, telephone numbers, email addresses, social security numbers, current and past employers, current salaries, employment history, financial institutions at which the user and family members of the user may have one or more financial accounts and financial account information for the user and family members at these financial institutions. Other factual information is possible. Examples of subjective information can include likes and preferences of the user and of family members of the user and opinions of others regarding the user and family members of the user. Other subjective information is possible.

As used in this disclosure, confidential information can refer to personal and other information regarding the user and family members of the user that the user does not want to disclose to the public and for which the user may want to restrict access of employees of a financial or other institution who uses or has access to such information. Examples of confidential information can include personal information for the user and family members of the user such as ages, social security numbers, email addresses and current salaries. Confidential information can also include information regarding financial transactions for the user and for family members of the user and documents with sensitive information for which the user may want to restricted access. Other personal and sensitive confidential information are possible.

In example embodiments, pre-authentication can comprise authenticating the user to access the ATM even when the AR device is not within a close proximity of the ATM. For example, For example, the user can be pre-authenticated using the AR device from the user's vehicle when the user is in a parking lot near a building where the ATM is located. The user can establish a wireless connection between the AR device and the ATM and enter authentication information, such as a user ID and password into the AR device from the security of the user's vehicle. As another example, the user can be in a shopping mall that has an ATM. The user can go to an area of the shopping mall near the ATM that the user feels is secure. For example, the user can shop in a store near the ATM and, after shopping, find a spot in the store where the user is not surrounded by people. The user can then establish a wireless connection between the AR device and the ATM and enter authentication information for the ATM into the AR device. Other examples of pre-authentication using the AR device are possible.

Using the systems and methods with an ATM that does not have a user interface or at least does not require the input of personal information on a user interface of the ATM can permit a more secure transaction at the ATM than if a traditional ATM with a user interface was used. For instance, a transaction can be completed with an ATM without requiring the user to provide any personal or confidential information directly on the user interface of the ATM. This allows this information to be kept secret from others surrounding the ATM at the time of the transaction.

Authenticating the user when the AR device is not within a close proximity of the ATM permits the user to enter authentication information, such as personal identification (PIN) code, with greater security than if the user entered the authentication information at the ATM. For example, when the user is in a secure area, a thief standing nearby the ATM cannot watch the user enter the authentication information. Further, such information can possibly be entered on the AR device without requiring the user to provide movements that can be tracked by a person located near the individual. For example, the user could provide inputs such as passwords and/or pins using alternative input methods, such as eye movements that can be used to select letters/number. Or, authentication can be accomplished using other processes, such as biometrics, etc.

The user can also initiate one or more financial transactions for the ATM using the user interface for the ATM on the AR device. The pre-authentication and the initiation of the one or more financial transactions can be sent to the ATM via a wireless connection between the AR device and the ATM, such as through Bluetooth, NFC, cellular network protocols, Wi-Fi, etc.

As discussed, the user does not need to be at a close proximity of the ATM to initiate the financial transactions. However, for certain types of financial transactions, for example receiving cash from the ATM, the user does need to be at a close proximity of the ATM to receive the cash from the ATM or for other financial transactions such as depositing cash or checks at the ATM. In some implementations, for additional security, a second authentication at the ATM machine may be needed before the ATM machine will dispense cash to the user. In these implementations, the ATM may have a camera, scan an image of the user and verify the identity of the user. Alternatively, the ATM machine may have a wireless pairing mechanism, whereby the ATM can pair with AR device to authenticate the user. An example of a wireless pairing mechanism is near field communication.

The ATM user interface on the AR device can also provide budgeting information for the user and can warn the user when a financial transaction using the ATM can have negative impact on the financial health of the user. For example, when the user initiates a financial transaction for the ATM on the AR device to withdraw cash from the ATM for a specific dollar amount and a determination is made that the cash withdrawal will impact a budgetary goal for the user, the AR device can display a warning message for the user. The warning message can inform the user that the cash withdrawal will impact one or more budget categories. In some implementations, the AR device can display one or more budget categories that will be impacted and show how the financial transaction will impact each of the one or more budget categories. In some implementations, the AR device can be prevented from initiating the financial transaction without an affirmative response from the user.

As another example, when a determination is made that the user does not have enough cash for the cash withdrawal in the user's bank account, the AR device can display a warning message indicating that the user does not have enough a high enough balance in the user's financial account to support the cash withdrawal.

The user interface on the AR device can also provide feedback to the customer when cash transactions at the ATM can affect other user transactions such as bill pay. When the user has setup bill pay at the financial institution and a determination is made that a user bill is due to be paid via bill pay, the financial institution server computer can determine whether the cash transaction at the ATM will impact paying the bill that is due. For example, when the customer has enough available funds to pay the bill that is due but a cash transaction at the ATM will cause the customer's financial account to be lowered such that the customer would not have enough funds to pay the bill that is due, a notification to that effect can be displayed on the AR device.

In an example implementation, the user would need to make an affirmative response at the AR device to permit the cash transaction. In another example implementation, the ATM may be prevented from dispensing cash to the user when the cash to be dispensed will negatively impact the customer's ability to pay upcoming bills.

In addition to the AR device, the systems can methods can provide an ATM user interface through other wearable devices such as a smartphone or smartwatch.

The systems and methods can improve efficiencies for a financial institution server computer such as server computer 120 when supporting an ATM. Using the systems and methods, a plurality of users can be pre-authenticated and initiate transactions at the ATM using AR devices. Pre-authenticating a plurality of users and initiating processing of transactions for a plurality of users at the ATM can be more efficient than handling each user authentication and transaction separately. In addition, for transactions that do not require a user's physical presence at the ATM (for displaying account balances or budgeting information for a user), the financial institution server computer can efficiently process these transactions all at once rather than needing to wait for each user to individually use the ATM to complete these transactions.

Additional efficiencies can be obtained by providing budgeting information to the user during a financial transaction. The financial institution server computer can be more efficient because the budgeting information can be provided at the same time as the financial transaction is processed. This can be more efficient than separately processing the financial transaction and then, at a later time reviewing budget information for the user and sending the budget information to the user. In addition, operations like preventing a user from completing a financial transaction that could impact the user's ability to pay bills via bill pay can be more efficient then allowing the user to complete the financial transaction and then, at a later time when a bill is due, sending a notification to the user that the user does not have sufficient funds for paying the bill. Other efficiencies are possible.

Figure 10:
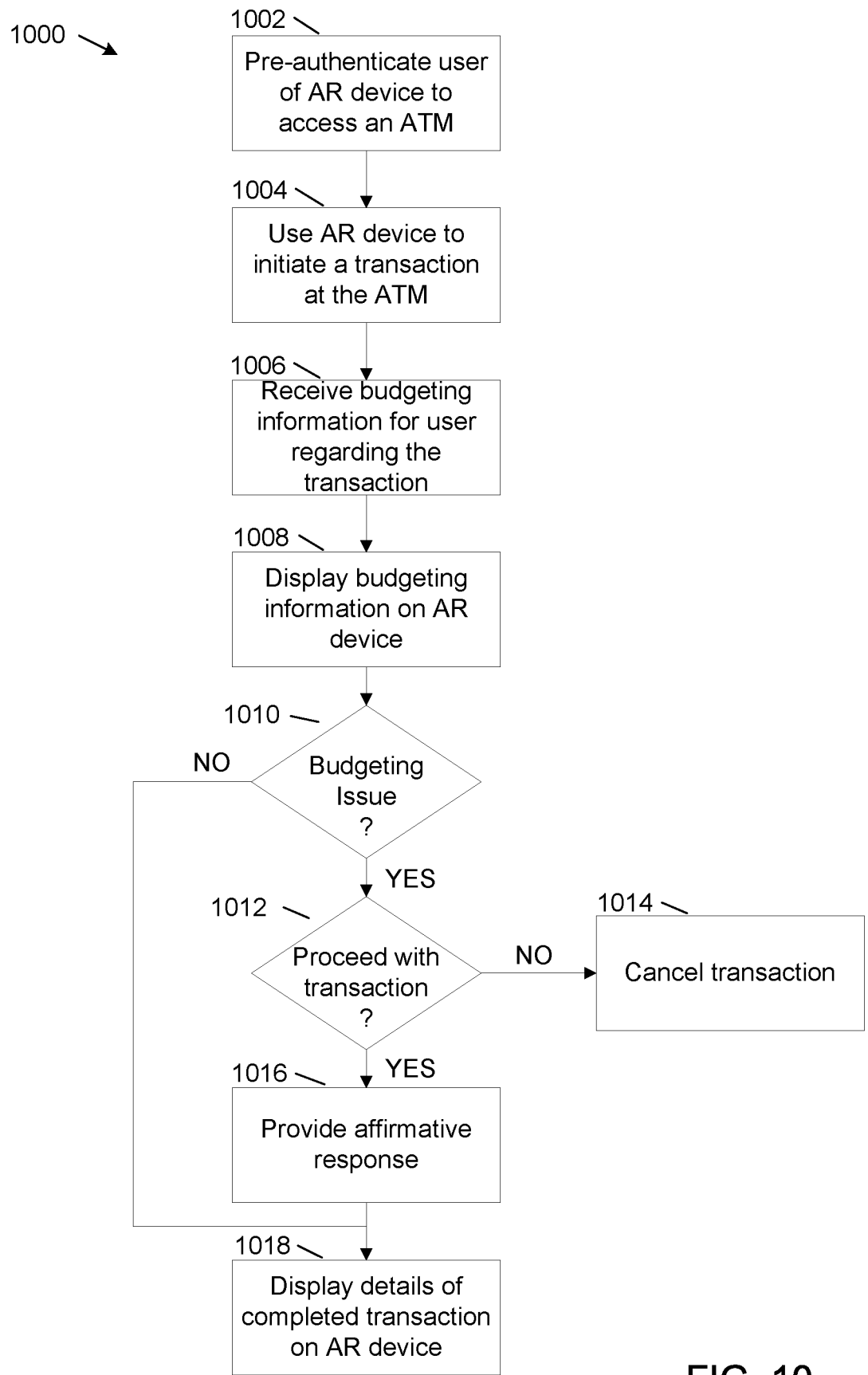
FIG. 10 shows a flowchart of an example method for using an ATM without a user interface with an AR device.

FIG. 10 shows a flowchart of a method 1000 for using an ATM without a user interface with an AR device.

At operation 1002, the user of the AR device is pre-authenticated at the AR device to access an ATM. The user can be pre-authenticated via entering user credentials, such as a financial account number and a password, into a user interface for the ATM that can be displayed on the AR device. The user interface for the ATM can be activated via a software application on the AR device. When the software application is activated, the user can establish a wireless connection with the ATM and then enter the user credentials.

To establish the wireless connection and be pre-authenticated, the user does not need be at a physical location of the ATM. Instead, the user can be in a secure area away from the ATM. In an example implementation, if the user establishes the wireless connection using a technology such as Bluetooth, and uses a class 2 Bluetooth connection, the user can be at a distance approximately 10 meters or less from the ATM and establish the wireless connection. For other classes of Bluetooth and other wireless technologies, different distances can be used.

At operation 1004, the user initiates a financial transaction at the ATM using the user interface for the ATM on the AR device. To initiate the financial transaction, the user does not need to be at the physical location of the ATM. Example financial transactions that can be initiated can include requesting a cash withdrawal at the ATM, depositing cash or checks at the ATM, transferring money between financial accounts, requesting account balance information and purchasing stamps at the ATM. Other financial transactions are possible, depending on the capabilities of the ATM.

At operation 1006, budgeting information for the user can be received at the AR device. The budgeting information can take into consideration the initiated financial transaction and can show an impact of the financial transaction on the user's budget. For example if the user has a budget category for cash withdrawals, the budgeting information can show a balance for the cash withdrawal budgeting category that takes into account the initiated financial transaction.

At operation 1008, the budgeting information is displayed to the user on the AR device. When there is a budgeting issue regarding the initiated financial transaction, a notification regarding the budgeting issue can be displayed on the AR device. For example, when the cash withdrawal exceeds an allocated amount for cash withdrawals, a notification to this effect can be displayed on the AR device.

At operation 1010, a determination is made as to whether there is a budgeting issue with the initiated financial transaction.

At operation 1010, when a determination is made that there is not a budgeting issue with the initiated financial transaction, the financial transaction is implemented, for example at server computer 120, and at operation 1018, details of the completed financial transaction are displayed on the AR device.

At operation 1010, when a determination is made that there is a budgeting issue with the initiated financial transaction, at operation 1012, the user can determine whether to proceed with the financial transaction. For example, if the cash withdrawal budgeting category is exceeded, the user can still decide to proceed with the financial transaction by providing an affirmative response to proceed with the financial transaction. Alternatively, the user can decide to cancel the initiated financial transaction.

At operation 1012, when the user decides to proceed with the financial transaction, at operation 1016 the user can provide an affirmative response to proceed with the financial transaction. In an example implementation, a dialog box can be displayed on the AR device and the use can select to proceed with or cancel the financial transaction by clicking an appropriate box on the dialog box.

When the user provides the affirmative response to proceed with the financial transaction, the financial transaction is implemented, for example at server computer 120, and at operation 1018, details of the completed financial transaction are displayed on the AR device.

At operation 1012, when the user decides not to proceed with the financial transaction, at operation 1014, the financial transaction is canceled.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A method implemented on an augmented reality (AR) electronic device, the method comprising:
    at the AR electronic device, establishing a wireless connection with an automated teller machine (ATM), wherein a graphical user interface of the ATM is blank so all financial information associated with a financial transaction with the ATM is only displayed on the AR electronic device;
    using the AR electronic device, authenticating a user of the AR electronic device to access the ATM from a location different than where the ATM is located;
    permitting initiation of the financial transaction through user interface functionality for the ATM that is only displayed on the AR electronic device;
    sending the financial transaction from the AR electronic device to a server computer;
    queuing the financial transaction at the server computer associated with the ATM until the ATM becomes available to the user of the AR electronic device;
    when the ATM becomes available to the user of the AR electronic device, executing the financial transaction;
    receiving at the AR electronic device, financial information for the financial transaction from the server computer; and
    displaying the financial information for the financial transaction only on a display screen of the AR electronic device, instead of displaying the financial information at the ATM.

2. The method of claim 1, further comprising:
    as a result of initiating the financial transaction at the ATM, receiving further financial information from the ATM related to the financial transaction; and
    displaying the further financial information on the display screen of the AR electronic device.

3. The method of claim 1, further comprising selecting aspects of the financial transaction from a menu on a user interface of the AR electronic device.

4. The method of claim 1, wherein, before initiating the financial transaction, further comprising, displaying budgeting information for the user on the display screen of the AR electronic device.

5. The method of claim 4, wherein the budgeting information indicates an impact of the financial transaction on a budget of the user.

6. The method of claim 1, further comprising displaying on the AR electronic device a warning to the user when the financial transaction is in conflict with financial goals of the user.

7. The method of claim 1, further comprising:
    completing a cash transaction at the ATM; and
    after the cash transaction is completed, displaying updated budgeting information to the user on the AR electronic device, the updated budgeting information taking into account the cash transaction.

8. The method of claim 1, further comprising pre-authorizing the user for the ATM before the user comes within a predetermined distance of the ATM.

* * * * *